US011325281B2

(12) United States Patent
Kunc et al.

(10) Patent No.: US 11,325,281 B2
(45) Date of Patent: May 10, 2022

(54) RAPID MANUFACTURING OF TAILORED PREFORMS

(71) Applicant: UT-Battelle, LLC, Oak Ridge, TN (US)

(72) Inventors: Vlastimil Kunc, Knoxville, TN (US); Craig A. Blue, Knoxville, TN (US); Ahmed A. Hassen, Knoxville, TN (US); John M. Lindahl, Knoxville, TN (US); Lonnie J. Love, Knoxville, TN (US); Brian K. Post, Knoxville, TN (US)

(73) Assignee: UT-BATTELLE, LLC, Oak Ridge, TN (US)

(*) Notice: Subject to any disclaimer, the term of this patent is extended or adjusted under 35 U.S.C. 154(b) by 365 days.

(21) Appl. No.: 16/519,746

(22) Filed: Jul. 23, 2019

(65) Prior Publication Data

US 2020/0023556 A1    Jan. 23, 2020

Related U.S. Application Data

(60) Provisional application No. 62/701,860, filed on Jul. 23, 2018.

(51) Int. Cl.
*B29C 31/08* (2006.01)
*B29C 43/34* (2006.01)
(Continued)

(52) U.S. Cl.
CPC .......... *B29C 31/085* (2013.01); *B29C 31/045* (2013.01); *B29C 43/18* (2013.01); *B29C 43/34* (2013.01)

(58) Field of Classification Search
CPC ....... B29C 31/045; B29C 43/18; B29C 43/34; B29C 31/085
(Continued)

(56) References Cited

U.S. PATENT DOCUMENTS 5,165,941 A * 11/1992 Hawley ................... B29B 7/603
425/148
6,875,298 B2    4/2005 Ickinger
(Continued)

FOREIGN PATENT DOCUMENTS

| CA | 1025167 A1 | 1/1978 |
| DE | 102016117798 A1 | 3/2018 |
| KR | 1020150021279 A | 3/2015 |

*Primary Examiner* — Matthew J Daniels
*Assistant Examiner* — Gregory C. Grosso
(74) *Attorney, Agent, or Firm* — Warner Norcross + Judd LLP

(57) ABSTRACT

A method for rapid manufacturing of three dimensional discontinuous fiber preforms is provided. The method includes the deposition of a polymeric material containing fibers on a surface to form a tailored charge for compression molding. The reinforced polymeric material may be a thermoplastic or a reactive polymer with viscosity low enough to allow flow through an orifice during deposition, yet high enough zero shear viscosity to retain the approximate shape of the deposited charge. The material can be deposited in a predetermined pattern to induce the desired mechanical properties through alignment of the fibers. This deposition can be performed in a single layer or in multiple layers. The alignment is achieved passively by shear alignment of the fibers or actively through fiber orientation control or mixing. The fibers can be of the desired material, length, and morphology, including short and long filaments.

14 Claims, 5 Drawing Sheets

(51) Int. Cl.
*B29C 43/18* (2006.01)
*B29C 31/04* (2006.01)

(58) Field of Classification Search
USPC .......................................... 264/239
See application file for complete search history.

(56) References Cited

U.S. PATENT DOCUMENTS

| | | |
|---|---|---|
| 2003/0127765 A1 | 7/2003 | Weiland et al. |
| 2008/0305144 A1* | 12/2008 | Brown .................... A61L 27/50 424/423 |
| 2014/0343197 A1* | 11/2014 | Guha ....................... C08J 5/045 524/35 |
| 2015/0104633 A1* | 4/2015 | Blanchard ........... B29C 48/2886 428/297.4 |
| 2017/0170453 A1* | 6/2017 | Rios ....................... H01G 11/44 |
| 2019/0219785 A1* | 7/2019 | Radelet ................. H02G 15/06 |

* cited by examiner

RAPID MANUFACTURING OF TAILORED PREFORMS

CROSS-REFERENCE TO RELATED APPLICATIONS

This application claims the benefit of U.S. Provisional Application 62/701,860, filed Jul. 23, 2018, the disclosure of which is incorporated by reference in its entirety.

STATEMENT REGARDING FEDERALLY SPONSORED RESEARCH AND DEVELOPMENT

This invention was made with government support under Contract No. DE-AC05-00OR22725 awarded by the U.S. Department of Energy. The government has certain rights in the invention.

BACKGROUND OF THE INVENTION

The present invention relates to an improved method of manufacturing a composite preform including discontinuous fibers.

Multi-dimensional articles can be made of a preform having internal fibers arranged in one, two, or three dimensions. Traditionally, in continuous reinforced composites the fibers are fixed in a desired orientation at a predictable fiber volume according to one of a number of methods. For example, continuous fibers can be woven, stitched, or knitted, while discontinuous chopped fibers can be sprayed with a random orientation. The dry fiber forms are subsequently impregnated with a resin in a closed mold process, such as resin transfer molding (RTM) or vacuum assisted transfer molding (VARTM). The composite can then be used to achieve a net-shaped part with improved properties over metal parts.

However, existing methods for forming discontinuous reinforcement composites lack control of the microstructure of the composite constituents, which plays a critical role in determining the mechanical and thermal properties of the finished article. Consequently, there remains a continued need for an improved method for the production of complex parts with a carefully tailored microstructure for achieving the desired mechanical and thermal properties. In addition, there remains a continued need for advanced preforming methods with economic feasibility over existing methods, including existing preforming methods.

SUMMARY OF THE INVENTION

A method for the rapid manufacturing of three dimensional discontinuous fiber preforms is provided. The method includes the deposition of a polymeric material containing fibers on a surface to form a tailored charge for compression molding. The reinforced polymeric material may be a thermoplastic or a reactive polymer with viscosity low enough to allow flow through an orifice during deposition, yet high enough zero shear viscosity to retain the approximate shape of the deposited charge. The material can be deposited in a predetermined pattern to induce the desired mechanical properties through alignment of the fibers. This deposition can be performed in a single layer or in multiple layers. The alignment is achieved passively by shear alignment of the fibers or actively through fiber orientation control or mixing. The fibers can be of the desired material, length, and morphology, including both short and long filaments.

In one embodiment, the method for rapid manufacturing includes preparing a molding compound including an elongated fiber reinforcement and forming a preform by extruding the molding compound in two- or three-dimensional pattern onto a deposition surface, where the elongated fiber reinforcement self-aligns due to shear forces during the extrusion. The method further includes forming a mold charge by positioning the preform within a complex three-dimensional mold such that the aligned fiber reinforcements include the desired orientation, and compression molding the preform to achieve a finished article. Example reinforcements include fiber powders, including short fibers and long fibers.

In this and other embodiments, the method can include processing a pelletized material (containing a fiber reinforcement therein) using a single screw extruder, a twin screw extruder, or a pumping mechanism for depositing high viscosity pastes. The deposition surface can include a flat surface, a shaped mold surface, a substrate to become part of the final article, or a previously manufactured article to be over-molded. The method can also include synchronized movement of the deposition mechanism (e.g., a single screw extruder or a twin screw extruder), the deposition surface, or both the deposition mechanism and the deposition surface. Example compositions produced according to the foregoing method include thermoplastic articles containing short fibers (melt extruded pellets), thermoplastic articles containing long fibers (pultruded pellets), thermoset materials with or without internal fibers, foams, neat polymers, and combinations of the same.

These and other features and advantages of the present invention will become apparent from the following description of the invention, when viewed in accordance with the accompanying drawings and appended claims.

DETAILED DESCRIPTION OF THE CURRENT EMBODIMENTS

As discussed herein, a method according to one embodiment includes the rapid manufacturing of a compression molded article with a preform having discontinuous fiber reinforcements in a desired alignment to achieve mechanical, electrical, and/or thermal properties. The method is described below in connection with the system of FIG. 1 and generally includes (a) preparing a molding compound including fiber reinforcements, (b) forming a preform by extruding the molding compound in a two or three-dimensional pattern onto a deposition surface, (c) forming a mold charge by positioning the preform with the two or three-dimensional pattern into a mold, such that the aligned fiber reinforcements have the desired orientation, and (d) compression molding the preform to achieve the finished article.

Figure 1:
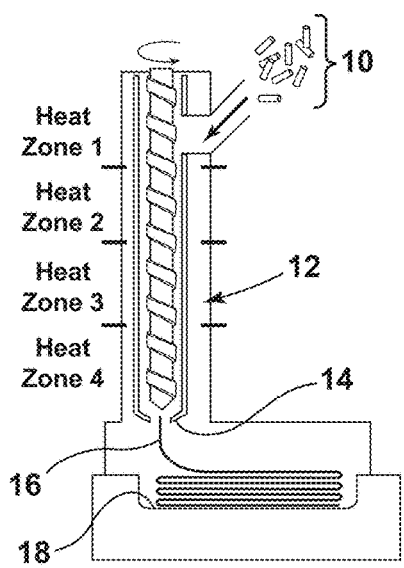
FIG. 1 is an illustration of a system for manufacturing an article using a preform formed according to one embodiment of the invention.
Figure 1:
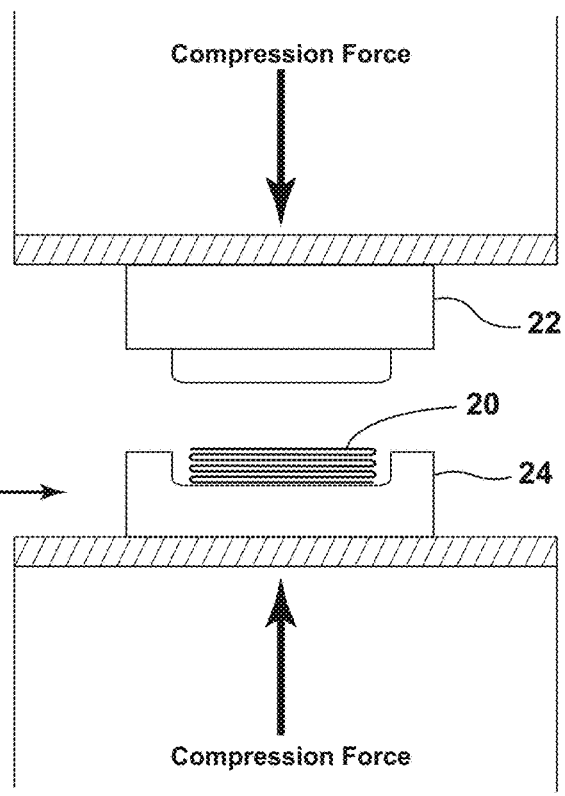

Referring now to FIG. 1, preparing a molding compound generally includes combining a polymeric molding material with discontinuous fiber reinforcements to achieve a feed material, e.g., a plurality of pellets 10. The polymeric molding material is a thermoplastic (e.g., ABS plastic) or a reactive polymer in the current embodiment, but can include other polymeric molding materials in other embodiments. The polymeric molding material includes a viscosity that is low enough to allow flow through an orifice, and includes a high enough zero shear viscosity to retain the desired shape of the deposited charge. The fiber reinforcements can include, for example, melt extruded pellets (short fibers) or pultruded pellets (long fibers) formed of glass or graphite. The fibers can include an aspect ratio of between 1:30 and 1:500, inclusive. The fibers include glass fibers in the current embodiment, while the reinforcements can include other materials having good dimensional stability and high stiffness. Other feed materials include long-fiber-thermoplastics (LFT), typically 0.25 inches in length or greater, and short-fiber-plastics (SFT), typically less than 0.25 inches. In other embodiments, the reinforcements can include spheres, granules, and flakes.

As also shown in FIG. 1, a single screw extruder processes the pelletized feed material. In other embodiments, the polymeric molding material and the discontinuous fiber reinforcements are processed within a twin screw extruder. The extruder 12 includes multiple heat zones and a narrow nozzle opening 14 having a converging sidewall for depositing the resulting fiber-embedded molding compound 16 on a deposition surface 18. The deposition surface 18 includes a female die in the illustrated embodiment, but can include other complex surfaces in other embodiments. For example, the deposition surface can include a flat surface to allow formation of the charge prior to transfer to a mold cavity. Also by example, the deposition surface can include a sheet of material (or a shaped substrate) that becomes part of the finished article. Still further optionally, the deposition surface can include a previously manufactured article to be over-molded.

Figure 2:
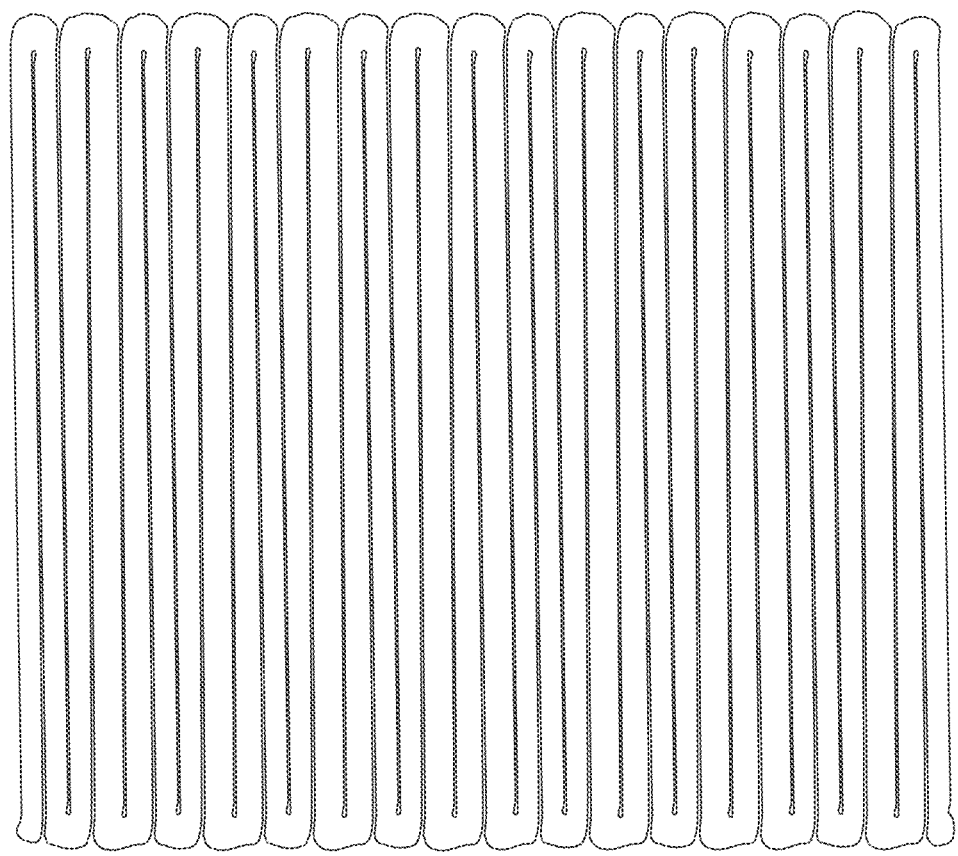
FIG. 2 is an illustration of long fiber preform processed through a single screw extruder in accordance with the current embodiment.

Movement of the heated molding compound through the extruder 12 (as a high shear environment), as well as its exit from the nozzle opening 14, imparts a tangential stress (shear stress) to substantially align the embedded fiber reinforcements. The fiber reinforcements exit the nozzle opening 14 with a high degree of alignment in the direction of the discharge of the molding compound, parallel to the length of extrusion. Alternatively, the alignment can be achieved actively through fiber orientation control and mixing. Forming the preform also includes the computer-controlled movement of the extruder 12 relative to the deposition surface 18. The can include synchronized movement of the extruder 12 (or other deposition mechanism), the deposition surface, or both the deposition mechanism and the deposition surface. This can also include rotation of the deposition surface on a turn table relative to the extruder. The extrusion 16 can also follow a three-dimensional pattern, for example as depicted in FIG. 1, such that the preform 20 includes successive layers of the molding compound, such that a first pass of the extruder 12 creates a first extrusion layer and a successive pass of the extruder 12 creates a second extrusion layer above the first extrusion layer. As shown in FIG. 2, the extrusion 16 can also follow a two-dimensional pattern, for example a side-to-side deposition to form a disc-shaped preform 20. Because the fiber reinforcements are generally aligned during extrusion, the pattern can be selected such that the preform includes fiber reinforcements aligned in a desired orientation.

Figure 3:
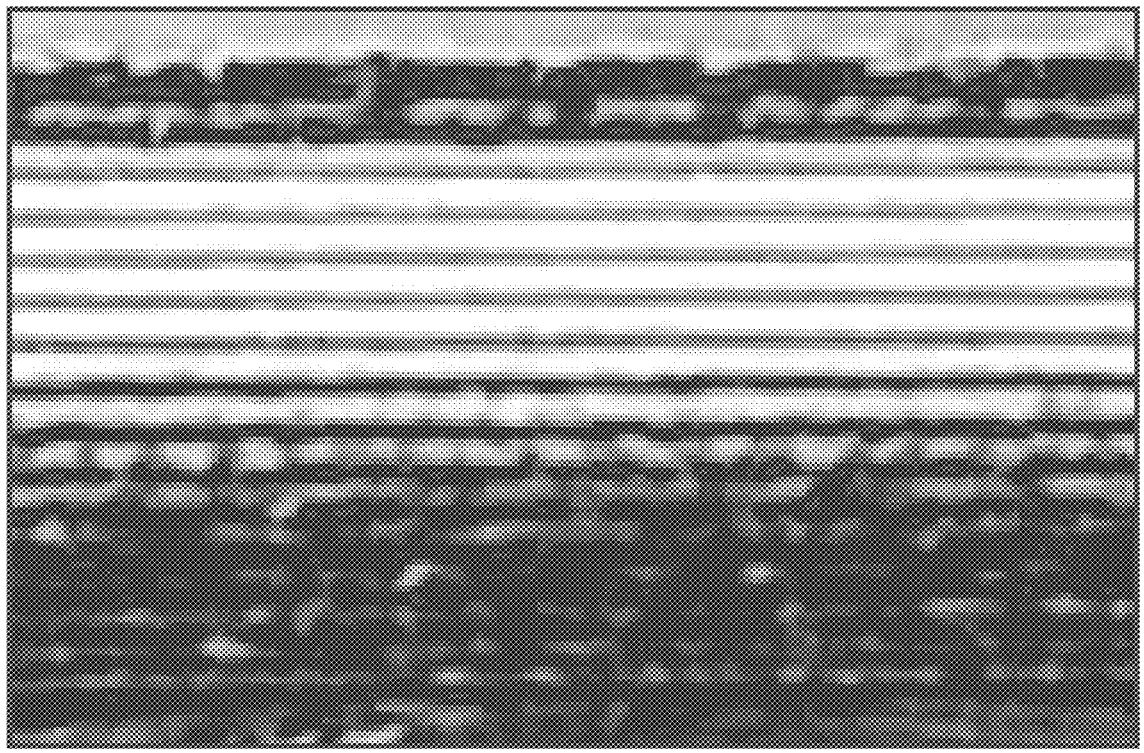
FIG. 3 is an example multi-material preform containing a rapid transition from a carbon filled material to a glass filed material.
Figure 4:
FIG. 4 is an example multi-material preform containing a gradual transition from a carbon filled material to a neat polymer.

Forming the preform generally includes extruding the molding compound in a two or three-dimensional pattern onto the deposition surface 18. The density of fibers reinforcements (e.g., elongated fiber powders) in the molding compound can be fixed or can vary, depending on the particular application (e.g., between 10% by weight and 60% by weight carbon fibers, further optionally 20% by weight carbon fibers). In addition, extruded sections of the molding compound can include a neat polymeric material without any fiber reinforcements as shown in FIG. 3. Further by example, the fiber reinforcements themselves can vary to provide a multi-material preform having a graded change in material composition as shown in FIG. 4. In this example, the method of forming a bulk molding compound includes introducing a second plurality of elongated fiber reinforcements (e.g., glass) in place of the first plurality of elongated fiber reinforcements (e.g., graphite) such that the extruded preform includes a change in material composition along its length. Still other embodiments include transitioning from a plurality of elongated fiber reinforcements (e.g., glass or graphite) into a polymer having no fiber reinforcements. These transitions can be gradual or abrupt, depending on the desired material properties of the finished article.

Forming a mold charge then includes positioning the preform with a mold, such that the aligned fiber reinforcements having the desired three-dimensional orientation within the mold cavity. As shown in FIG. 1 for example, the mold includes a fast acting compression molding press having a top mold component 22 and a bottom mold component 24. The top mold component 22 is a male mold part and the bottom mold component 24 is a female mold part in the present embodiment. The mold charge 20 includes embedded fiber reinforcements that are aligned in accordance with the deposition process described above, with two or more layers of the extrusion (e.g., an upper layer supported by a lower layer). The mold charge 20 is then compression molded to produce a rate of flow within the mold cavity, dependent upon the amount of heat and pressure applied during the molding process. The fiber microstructure is distributed substantially uniformly (as opposed to having a random orientation) to exhibit anisotropic structural and/or thermal properties based on the alignment of the fiber reinforcements within the mold charge 20. In other embodiments, the deposition surface 18 is separate from the mold cavity, and the preform is transferred to the bottom mold component 24.

Figure 5:
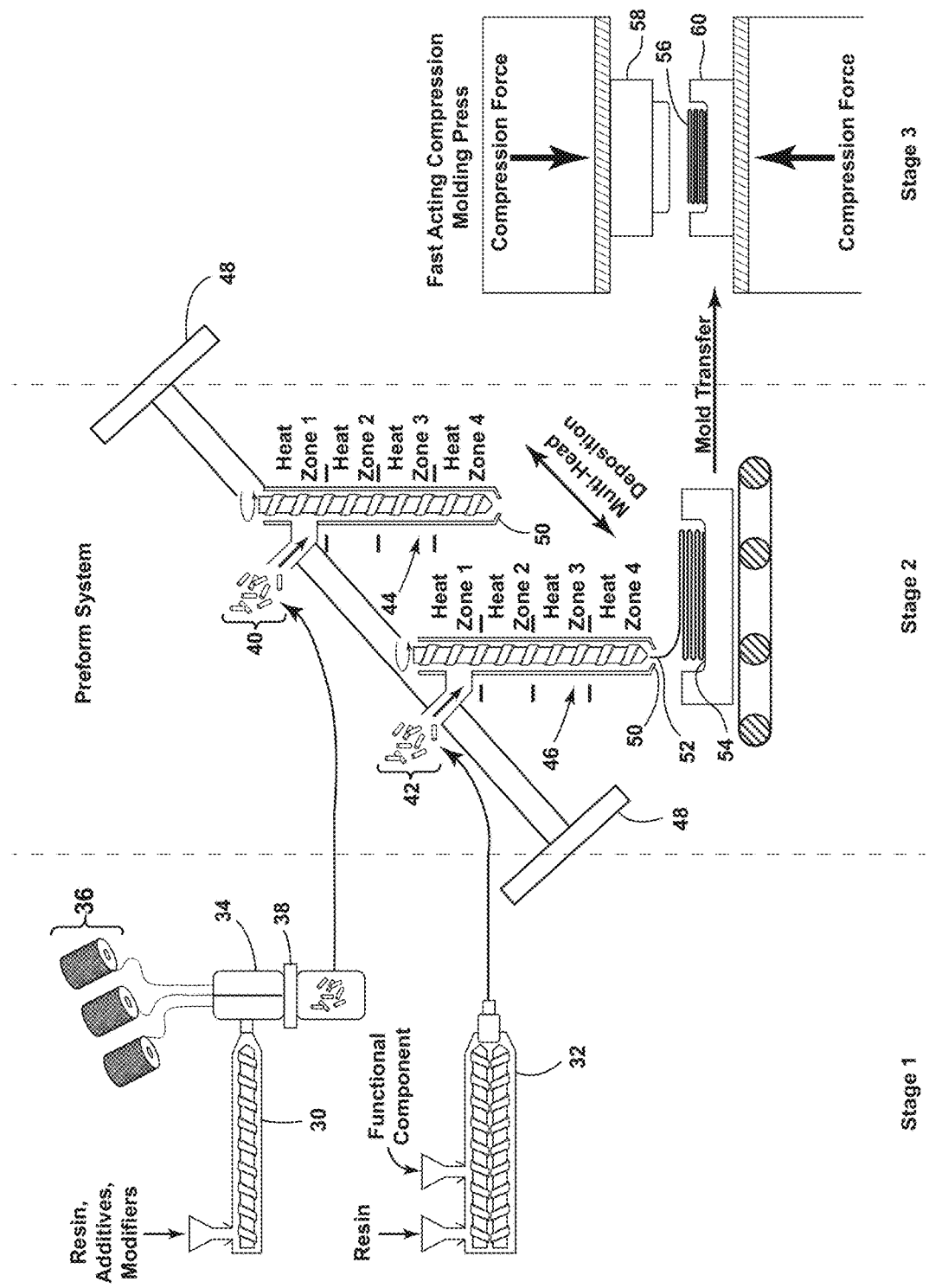
FIG. 5 is an illustration of a system for manufacturing an article using a preform formed according to another embodiment involving long fiber thermoplastics (LFT) or short fiber thermoplastics (SFT) and a multi-material composition.

In a further embodiment as shown in FIG. 5, a system for manufacturing an article using a composite preform is illustrated. The system includes, as a first stage, a compounding extruder 30 and a twin screw extruder 32 for forming a pelletized feed material. The compounding extruder 30 is adapted to receive a resin, additives, and modifiers. The output of the compounding extruder 30 forms a impregnated tow 34 from one or more fiber rovings 36. The impregnated tow 34 is separated into individual pellets by a pelletizer/chopper 38. The resulting pellets 40 are long-fiber-thermoplastics or short-fiber-thermoplastics for stage two processing. Stage one processing also includes melt extruded pellets 42 from the twin screw extruder 32, combining a resin and a functional component. At stage two, the LFT or SFT composite pellets are transferred to a first screw extruder 44 and the functional component pellets 42 are transferred to a second screw extruder 46. Each screw extruder 44, 46 is coupled to a gantry crane system 48 for manipulation of the extruders 44, 46 in the x-direction, the y-direction, and the z-direction for forming a three-dimensional preform. The preform includes material from the first screw extruder 44 and the second screw extruder 46, in that the first screw extruder 44 is selectively turned off while the second screw extruder 46 is turned on, and the first screw extruder 44 is selectively turned on while the second screw extruder 46 is selectively turned off. In this way, the system can provide a multi-material preform having a graded change in the composition of the fiber reinforcements and/or the length of the fiber reinforcements. Each extruder includes a nozzle opening 50 for discharging the extrusion 52 onto a deposition surface 54. The deposition surface 54 includes a female die in the illustrated embodiment, but can include other complex surfaces in other embodiments. The discontinuous fiber reinforcements exit the nozzle opening 50 with a high degree of alignment in the direction of the discharge of the molding compound, parallel to the length of extrusion 52. Optionally, the discontinuous fiber reinforcements include a length of less than 2.0 inches, further optionally about 0.5 inches (LFT) or less than 0.5 inches (SFT). Forming the preform includes the computer-controlled movement of the extruders 44, 46 relative to the deposition surface 58. Stage three processing includes compression molding the resulting charge 56 within a fast acting compression molding press having a male mold component 58 and a female mold component 60. The mold charge 56 includes embedded fiber reinforcements that are aligned in accordance with the deposition process described above. The mold charge 56 is compression molded to produce a rate of flow within the mold cavity, dependent upon the amount of heat and pressure, while also avoiding defects (pits or pockets) commonly found in free space deposition processes, e.g., additive manufacturing. The resulting article includes a fiber microstructure that is distributed substantially uniformly.

EXAMPLE

A vertical extruder attached to a 3-axis gantry system was used to directly deposit an extruded molding compound atop a compression molding mold. The bottom mold half was placed on a moving platen that can slide and in and of the compression press to allow the deposition of the preforms. The molding compound included ABS/carbon fibers (20% by weight). The extruder traveled in the x-direction of the mold, laying down materials and creating a first layer of the preform for a 0-degree layup. After depositing the first layer of the preform, the extruder moved up in the z-direction and traveled in the y-direction to create another layer of deposited material (i.e., 90-degree layup) to provide a final part with orthotropic behavior. The mold was transferred to a 100-ton compression molding machine to press the material to the final desired shape. The method of the present invention was determined to produce finished articles having carefully tailored mechanical and/or thermal properties. The present method allows deposition of a polymeric material containing a second phase reinforcement (fiber reinforcement) on a surface to form a tailored charge for compression molding. The reinforced polymeric material may be a thermoplastic or a reactive polymer, for example, with a viscosity low enough to flow through an orifice during deposition high enough zero shear velocity to retain the approximate shape of the deposited charge. The deposition can be performed in a single layer or multiple layers, and the alignment can be achieved passively or actively through fiber orientation control and mixing.

The above description is that of current embodiments of the invention. Various alterations and changes can be made without departing from the spirit and broader aspects of the invention as defined in the appended claims, which are to be interpreted in accordance with the principles of patent law including the doctrine of equivalents. Any reference to elements in the singular, for example, using the articles "a," "an," "the," or "said," is not to be construed as limiting the element to the singular.

The invention claimed is:
1. A method for manufacturing an article comprising:
feeding a first plurality of thermoplastic pellets and a first plurality of discontinuous elongated fiber reinforcements into an extruder and thereafter feeding a second plurality of thermoplastic pellets and a second plurality of discontinuous elongated fiber reinforcements into the extruder to form a molding compound, the first and second plurality of discontinuous elongated fiber reinforcements including an aspect ratio of between 1:30 and 1:500, the extruder having a nozzle opening;
forming a three-dimensional preform by discharging the molding compound from the nozzle opening onto a deposition surface, wherein the first plurality of discontinuous elongated fiber reinforcements are different from the second plurality of discontinuous elongated fiber reinforcements, such that the molding compound includes a change in material composition along a portion of a length of the molding compound as the molding compound is discharged from the nozzle opening, wherein the first and second plurality of discontinuous elongated fiber powders self-align due to shear forces during the extrusion, the first and second plurality of discontinuous elongated fiber reinforcements including at least one of glass and graphite;
forming a mold charge by positioning the three-dimensional preform within a mold, the mold including a top mold component and a bottom mold component; and
compression molding the preform within the mold to form a finished article having anisotropic properties due to substantial alignment of the first and second plurality of discontinuous elongated fiber reinforcements within at least a portion of the finished article.

2. The method of claim 1 wherein forming the preform includes causing relative movement between the extruder and the deposition surface in an x-direction, a y-direction, and a z-direction such that the preform comprises a three-dimensional layup having a first layer and a second layer supported above the first layer.

3. The method of claim 1 wherein the deposition surface comprises a portion of the article to be overmolded for forming the finished article.

4. The method of claim 1 wherein the extruder is a single screw extruder or a twin screw extruder and includes a plurality of heat zones.

5. The method of claim 1 wherein the molding compound includes between 10% and 60% by weight elongated fiber reinforcements, inclusive.

6. The method of claim 1 wherein forming the three-dimensional preform includes computer-controlled movement of the extruder relative to the deposition surface.

7. The method of claim 1 wherein an upward facing surface of the bottom mold component comprises the deposition surface.

8. A method for manufacturing an article comprising:
preparing a molding compound by feeding a first plurality of thermoplastic pellets and a first plurality of discontinuous elongated fiber reinforcements into an extruder and thereafter feeding a second plurality of thermoplastic pellets and a second plurality of discontinuous elongated fiber reinforcements into the extruder, the first and second plurality of discontinuous elongated fiber reinforcements including an aspect ratio of between 1:30 and 1:500;
forming a preform by extruding the molding compound in a continuous bead having a three-dimensional pattern, wherein the first plurality of discontinuous elongated fiber reinforcements are different from the second plurality of discontinuous elongated fiber reinforcements, such that the molding compound includes a change in material composition along a portion of a length of the molding compound as the molding compound is discharged from the extruder, wherein the first and second plurality of discontinuous elongated fiber reinforcements self-align due to shear forces during the extrusion, the first and second plurality of discontinuous elongated fiber reinforcements including at least one of glass and graphite;
forming a mold charge by positioning the three-dimensional preform within a mold, the mold including a top mold component and a bottom mold component; and
compression molding the preform within the mold to form a finished article having anisotropic properties due to substantial alignment of the first and second discontinuous elongated fiber reinforcements within at least a portion of the finished article.

9. The method of claim 8 wherein the extruder is a single screw extruder or a twin screw extruder.

10. The method of claim 8 wherein the molding compound includes between 10% and 60% by weight elongated fiber powders.

11. The method of claim 8 wherein forming the three-dimensional preform includes computer-controlled movement of an extruder relative to a deposition surface.

12. The method of claim 11 wherein forming the preform includes causing relative movement between the extruder and the deposition surface in an x-direction, a y-direction, and a z-direction such that the preform comprises a three-dimensional layup having a first layer and a second layer supported above the first layer.

13. The method of claim 8 wherein forming the three-dimensional preform includes extruding the continuous bead directly onto a bottom mold component of the mold.

14. The method of claim 9 wherein the single screw extruder or twin screw extruder includes a plurality of heat zones for decreasing the viscosity of the molding compound.

* * * * *